Sept. 27, 1966     E. WILBUSHEWICH     3,274,794
APPARATUS FOR PRODUCING ICE BLOCKS IN MOLDS
Filed June 22, 1965     2 Sheets-Sheet 1
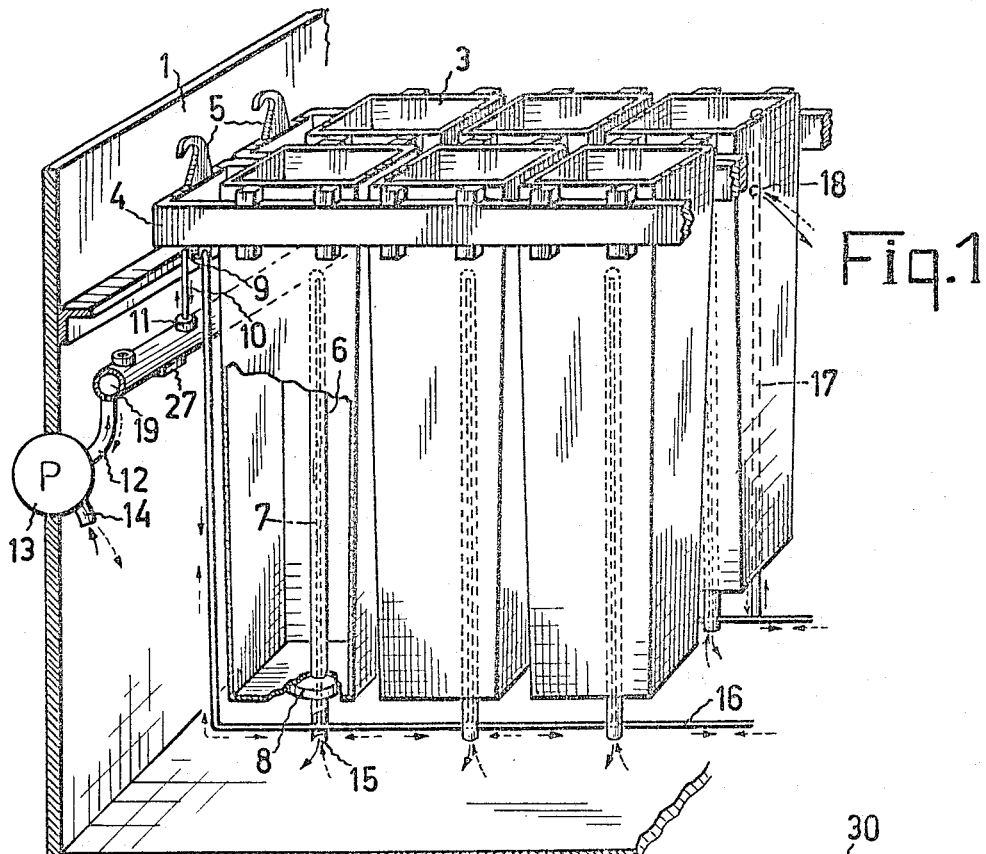
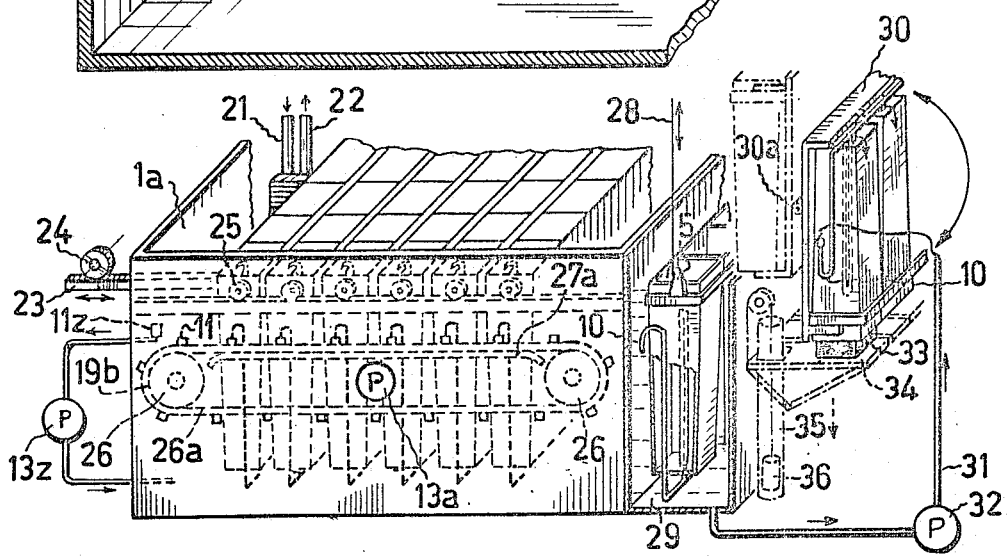
INVENTOR
EUGEN WILBUSHEWICH
BY
Kurt Kelman
Agent

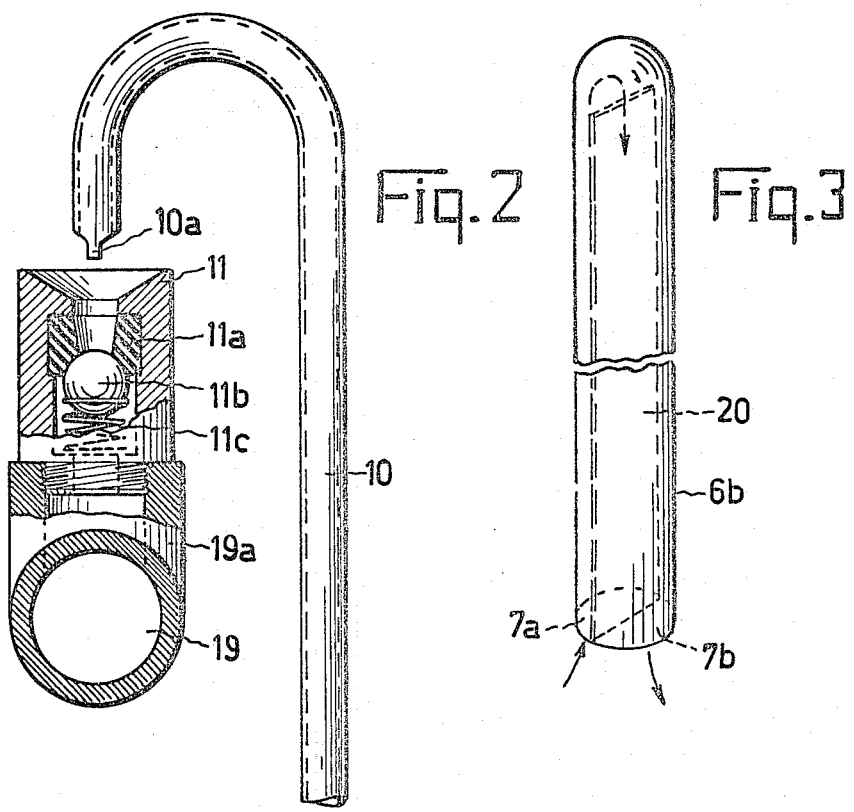

3,274,794
APPARATUS FOR PRODUCING ICE BLOCKS
IN MOLDS
Eugen Wilbushewich, Rotelstrasse 61,
Zurich, Switzerland
Filed June 22, 1965, Ser. No. 465,841
Claims priority, application Great Britain, Dec. 12, 1964,
50,699/64
11 Claims. (Cl. 62—349)

The invention relates to an improved method and apparatus for the production of ice blocks in ice molds that are placed in a brine tank.

It has been the practice all over the world, during the last ninety years or so, to produce ice blocks in ice molds immersed in a tank filled with brine which has been brought to a sub-freezing temperature. The completed ice blocks were subsequently thawed free by immersion in a sweet-water tank and eventually tipped onto a platform for eventual storage.

Despite occasional suggestions for producing ice blocks within brine tanks using ice molds provided with central tubes or fingers filled with brine, and for simultaneously extracting the heat from the mold walls and the core of the mold, no method for the rapid production of ice blocks in molds placed in a brine tank has been put into practice.

The object of this invention is to adapt known, conventional brine-tank ice plants by the addition of simple apparatus to permit a more rapid production of ice blocks.

According to the invention, ice blocks are produced by introducing a liquid to be frozen into one or more molds having a vertical axis, supporting said mold or molds during a freezing period in a tank containing cooled brine, and forcing the brine to flow internally and externally of the mold or molds in a direction substantially parallel with the vertical axis of each mold until an ice block is formed in each mold. Subsequently, a warm medium is applied to the outside of the mold or molds to free the ice block or blocks therefrom, and the ice block or blocks are harvested by tipping the mold or molds and by applying a warm medium to the inside of the mold or molds completely to free ice adhering thereto.

Further according to the invention, apparatus for carrying out ice block production comprises a tank containing cooled brine, a mold or a series of molds arranged to be supported in said tank immersed in the brine, each provided with a finger and a tube in thermal contact with the walls of the molds, said finger and tube extending upwardly from the base of each mold and having outlet apertures below the level of the brine, a conduit connected to the lower end of each finger and tube, and pump means for circulating the cooled brine through said fingers and tubes during a freezing operation.

Other objects, advantages and features of the present invention will be set forth in the following detailed description of certain preferred embodiments, taken in conjunction with the drawing, wherein—

FIG. 1 shows diagrammatically, and in perspective, part of a brine tank with part of only two rows of ice molds suspended therein, each row and the upwardly-reaching fingers and tubes in the molds being provided with a pipe to circulate brine delivered from a common pump and with a manifold suitable for small-capacity plants;

FIG. 2 is a cross section of a self-closing ball valve arranged to be actuated by the vertically moving ends of a manifold delivery pipe;

FIG. 3 is a perspective view of an alternative construction of a finger in an ice mold; and FIG. 4 is a perspective view showing the layout of a plant for the continuous production, thawing and harvesting of super-cooled blocks of ice in large-capacity plants.

Referring to the drawing, two sides of the brine tank 1 (FIG. 1) carry horizontal angle bars 2 which support frames 4 each carrying a row of ice molds 3 which are open on top. These molds are each provided, in their bottom, with a flange 8 supporting a finger 6 that is open at the bottom end and closed at the tip, the finger 6 extending upwardly for nearly the whole length of the mold. An open ended tube 7 extends downwardly in the finger and, near its mouth 15, it is connected to, and communicates with, the horizontal part of a manifold pipe 16 common to a row of ice molds 3.

The walls of the ice molds 3 also carry one or more vertical tubes 17 (FIG. 1) in contact with either the inside or outside thereof, and provided with an opening 18 into the tank. Tubes 17 are also connected to, and in communication with, the horizontal brine conduit 16 leading into tank 1. Consequently, the flow of brine from conduit 16 through tubes 17 and out of opening 18 downwardly along the mold wall in an axial direction of the molds will assist in the cooling of the mold walls carrying such tubes.

The frame 4 of each row is provided with hooks 5 to lift and lower groups of molds out of and into the tank 1. The tank is filled with cold brine which may be stirred to flow transversely over the outside walls of the immersed rows of molds, as is well known and need, therefore, be neither illustrated or described in detail.

The tank 1 carries a circulatory pump 13 (shown diagrammatically by the letter P) with an intake 14 and outlet 12, the latter feeding a delivery tube 19 supported by brackets 27 and provided with disconnectable socket couplings shown in FIG. 2. The couplings are arranged on top of, and are set into, the tube 19 at a distance equal to the distance of adjacent rows of molds. These couplings comprise a self-closing ball valve 11 (FIG. 2) which is adapted to be engaged by the downwardly-facing spigot end 10a of a pipe 10 which leads to the horizontal manifold 16. The ball valve contains the ball 11b held against a resilient seat 11a under the pressure of compression spring 11c, the valve body 11 being screwed into the threaded outlet 19a of the delivery tube 19.

The connecting pipe 10 supplies the tubes 7 and 17 with brine, and removes it therefrom, via the manifold 16, to cause refrigerant to flow to or from the fingers 6 and tubes 17 depending on which direction the pump P circulates the brine.

Instead of the concentric arrangement of tube 7 in finger 6 (FIG. 1), the alternative arrangement of FIG. 3 may be chosen. In this case, the finger 6b has a separating wall 20 to provide inlet and outlet passages 7a and 7b, respectively, to guide the circulating brine delivered by the manifold 16 in an axial direction along the walls of the fingers.

The mass of brine in the tank 1 is cooled and held at a temperature of, say, −10° C. by a conventional refrigerating plant (not shown) the evaporator of which is mounted near one side so as to be supplied by pipes 21–22 (FIG. 4) with liquefied, cooled refrigerant, in a conventional manner.

Depending on the size of the ice molds and the number of fingers 6 and tubes 17 therein, it takes up to about four to five hours for the ice of a large, for example 440 lb., ice block to be completed, which is a fraction of the time in which ice blocks were hitherto produced in brine tanks by conventional methods. After the completion of the ice blocks in a row of molds, the blocks are thawed free from the walls of the molds by lifting the frame 4 at its hooks 5 out of the brine tank 1, and transferring the molds to a thawing tank, where the warmer water loosens the ice adhering to the walls in a manner of minutes. Such a thawing tank is shown by 29 in FIG. 4. In this figure, there is also shown, on the right, the tipping arrangement and the thawing equipment for detaching the ice adhering to the fingers 6, prior to harvesting. With an initial brine temperature of −10° C., as mentioned, the subsequent thawing operations will somewhat reduce the final ice block temperature on harvesting, for example to approximately −7° C. This compares well with the normal harvesting temperature of an ice block which is often 0° C. when it is produced according to the conventional brine-tank method, in which the core of the block hardly ever reaches −1° C. Moreover, with the conventional method, the temperature gradient soon averages out, during thawing, and the block's temperature may rise another degree by the time it reaches the ice store.

In the continuous ice block production method employed in larger plants (FIG. 4), the rows of filled ice molds are lowered into the brine tank at regular intervals, so that groups of ice blocks are completed at different times. This spaced introduction of molds into the brine tank becomes possible because each row of molds is introduced after another frame has been lifted out of the brine tank 1a and into the thawing tank 29, for eventual harvesting of its row of ice blocks. Conventionally, after the front frame 4 on the right side of FIG. 4 has been lifted out, for thawing and other operations, the battery of frames in the brine tank is pushed stepwise forward, so that the rearward space of FIG. 4 is free to accept the newly-filled row of ice molds in their frame. In order to ease the advance of the battery, all frames are fitted with rollers 25 that are guided by the supporting angle bars 2. A rack 23 for advancing the frames is shown diagrammatically in FIG. 4, as is also its driving pinion 24. The pinion 24 is adapted to advance the battery by a step of one frame width, and then to retract the rack.

In FIG. 4, the delivery tube supplying brine pumped by pump P into the fingers 6 and tubes 17 of the ice molds, is also arranged to move stepwise with the advancing rows of ice molds. The delivery tube is formed as an endless hose 19b led over the pulleys 26 with its upper horizontal run supported by a ledge 27a fixed to the side of the brine tank. The pump 13a can, in a manner not shown, feed sucked-in brine from the tank 1a into the hose 19b, as for example, by a flexible tube (not shown) connected to one side of the hose. The overall length of the hose is such that the self-closing ball valves 11 can be evenly spaced therealong, the spacing corresponding to the distance between adjacent frames 4. Only those valves on the upper horizontal run of hose 19b are opened, the ends 10a of the delivery pipes 10 having engaged the valve balls 11b of those valves opposite which the frames 4 have been lowered onto bars 2.

By positioning the right-hand pulley 26 for the hose 19b in relation to the last row of molds, or otherwise controlling the valve action, it is possible to stop the delivery of brine to the fingers and tubes 6 and 17 of certain rows of molds. This interruption of the brine flow is of advantage in a large tank, which after the completion of a number of ice blocks is to be used as a buffer store for the completed ice blocks, prior to their being thawed off in tank 29, and stowed away.

The frame that is foremost in the tank 1a, i.e. the furthest to the right in FIG. 4, is eventually lifted out by means of a crane (not shown) having a cable 28. This frame is then lowered into the thawing tank 29. The water of the thawing tank 29 is at about room temperature and it can later be used primarily to thaw off the ice adhering to the fingers of the row of molds, in a secondary thawing operation. After the primary thawing, the frame is lifted onto a gripping-and-tilting jig 30 adapted to be swung 180° around the axle 30a thus, inverting the molds. By connecting a hose from pipe 31 to pipe 10, thawing water pumped by pump 32 will enter via pipe 31 and flow into the fingers 6 and tubes 17 until the ice adhering to the walls melts, and allows the ice blocks 33 to emerge and drop a short distance onto the receiving platform 34, in an upright position. Each block has its individual platform 34 initially held in an elevated position by the counterweight 36, movable inside a guide tube 35, over a distance at least corresponding to the length of the molds 3. The weight of an ice block 33, deposited on the platform 34, will overcome most of the counterweight 36 and slowly descend to a low position from where it can be conveniently conveyed to a storage shed. If necessary, the long and slender holes that are left in the ice block can be filled with water which will freeze solid due to the subzero temperature in the core of the harvested ice block. The emptied frame 4 can now be swung back by turning the gripping-and-tilting jig 30 to the dotted position whence it can be transferred to a filling position, in which a row of molds receive a new charge of water or other liquid to be frozen. Meantime, the rack 23 having advanced the battery of frames one step towards the right, and the pulleys 26 having turned to advance the hose 19b with its couplings 11 the required amount, the re-filled row of molds can be lowered into the now free space at the left of the tank 1a.

Before completely immersing the fresh frame, a ball valve 11z connected to a suction pump 13z is coupled to the end 10a of the manifold 16. The suction pump 13z serves to extract the air that is entrapped in the fingers 6 and fill the space therein with brine.

After the final lowering of the frame onto the bars 2, the end 10a of the supply pipe 10 is inserted into a coupling 11 to open its ball valve and thereby bring the brine that is pumped by pump 13a via hose 19b and manifold 16 to the fingers and tubes of the newly immersed row of molds. This enables the brine to circulate axially in the molds and thus accelerate the freezing of the liquid therein.

Alternatively, as is indicated by dotted arrows in FIG. 1, in order to remove the entrapped air within the fingers 6 of a freshly lowered frame 4, the pump 13 is for a short while reversed, thus acting as a suction pump via the ball valves 11.

What I claim is:

1. Apparatus for producing ice blocks in molds comprising a tank containing cooled brine, a battery of rows of ice molds in said tank, each mold having a base and a vertical axis, and each mold being arranged to be supported in said tank immersed in the brine, an internal finger associated with each mold and closed at an upper end and having a lower end in communication with the brine, the finger extending upwardly from the base of each mold, a brine supply tube, a conduit connected to the lower ends of said fingers in each row of molds, a common brine pump connected to the brine supply tube, disconnectable coupling means connecting each of said conduits to the brine supply tube, each coupling means comprising a socket part in communication with said supply tube, and a tubular spigot part on the conduit adapted removably to fit into said socket part, said socket part incorporating a spring loaded valve member adapted to close said socket part when a mold is removed from the tank for harvesting, and valve means in circuit with said conduits for selectively sucking off, and forcing into, said fingers, air cooled brine, and thawing water during successive air extraction, freezing and harvesting operations.

2. The apparatus defined in claim 1, further comprising a tube in thermal contact with a vertical wall of each mold, said tube extending upwardly from the base of the mold and having an outlet opening into the tank, each conduit being arranged to connect with said tube and finger lower ends.

3. The apparatus of claim 7, wherein the pump is a reversible-flow pump.

4. The apparatus of claim 1, wherein said supply tube is an endless hose and further comprising pulleys horizontally supporting the endless hose, said socket parts being mounted on the outer periphery of said hose at intervals corresponding to the spacing between the rows of molds in the brine tank, so as to be capable of being advanced stepwise in synchronism with the step-advance of the rows of molds in the brine tank during a continuous production of ice blocks.

5. The apparatus of claim 4, further comprising means for automatically interrupting the circulation of cooled brine through said fingers, on a mold row moving to a predetermined advance position in the brine tank, the molds with the completed ice blocks therein remaining supported in the tank for temporary storage, until required for harvesting and transfer to more permanent storage.

6. The apparatus of claim 4, wherein said endless hose extends along only a part of the length of the brine tank and said spigot and socket parts are arranged to be separated to permit the closing of said spring loaded valve member when the row of molds to which said spigot and socket are coupled is advanced into a temporary storage position in the tank.

7. The apparatus of claim 1, including a thawing tank and means for lifting the molds into and out of the thawing tank, and a mold gripping jig adapted substantially to invert the molds after they have been lifted into and out of the thawing tank.

8. The apparatus of claim 7, wherein said jig is arranged, after the ice blocks have been harvested, to move said molds back into an upright position for refilling with liquid to be frozen and to return the filled molds into the tank.

9. A method of producing ice blocks, comprising the steps of
(1) introducing a liquid to be frozen into a mold having a closed bottom, side walls and an open end,
(2) supporting the mold during a freezing period in cold brine, the mold being positioned in a direction along a vertical axis, with the bottom at a lower end of the mold and the open end at an upper end of the mold,
(3) circulating the cold brine into and out of a finger closed at an upper end and having an open lower end during the freezing period, the finger extending in the direction of the vertical axis through the mold bottom, with the closed finger end near the open end of the mold and the open finger end outside the mold,
(4) further delivering the cold brine during the freezing period to a tube in thermal contact with one of the mold side walls and removing the cold brine through an upper opening in the tube and passing through the one side wall, whereby the cold brine runs down said one side wall by gravity,
(5) inverting the mold in the direction of the vertical axis after the freezing period whereby the mold bottom is at the upper mold end and the open mold end is a the lower mold end,
(6) delivering a liquid thawing medium into the finger and into the tube, while the mold is inverted, and removing the thawing medium through the open end of the finger and through the opening in the tube, whereby the thawing medium runs over the mold bottom and down the mold side walls, and the ice block is thawed off the bottom and side walls of the mold,
(7) discontinuing the delivery and removal of the thawing medium when the ice block in the mold is thawed off, and
(8) removing the ice block through the open end of the mold by gravity without the ice block touching the thawing medium.

10. An apparatus for producing ice blocks, comprising
(1) a tank containing cold brine,
(2) a mold having a closed bottom, side walls and an open end, the mold being positioned in the cold brine in a direction along a vertical axis, with the bottom at a lower end of the mold and the open end at an upper end of the mold,
(3) a finger closed at an upper end and having an open lower end, the finger extending in the direction of the vertical axis through the mold bottom, with the closed finger end near the open end of the mold and the open finger end outside the mold and immersed in the cold brine,
(4) a tube in thermal contact with one of the mold walls, an upper opening of the tube passing through the one mold wall,
(5) a conduit connected to the lower end of the finger and a lower end of the tube,
(6) a cold brine delivery tube detachably connected to the conduit,
(7) pump means having an intake in communication with the cold brine and an outlet in communication with the delivery tube, whereby the cold brine may be delivered into the finger and the tube through the conduit connected thereto and the cold brine is removed therefrom through the open end of the finger and the opening in the tube,
(8) means for lifting the mold out of the tank,
(9) means for inverting the mold outside the tank in the direction of the vertical axis whereby the mold bottom is at the upper mold end and the open mold end is at the lower mold end,
(10) a liquid thawing medium delivery pipe detachably connectable to the conduit when the mold has been lifted out of the tank and inverted, and
(11) pump means having an intake in communication with a thawing medium supply and an outlet in communication with the pipe for delivering the liquid thawing medium into the finger and the tube through the conduit connected thereto, the liquid thawing medium being removed through the open end of the finger and the opening of the tube to run over the mold bottom and down the mold side walls.

11. The apparatus of claim 10, comprising a row of said molds, the conduit being connected to the lower ends of the fingers and the lower ends of the tubes of each mold in the row.

References Cited by the Examiner
UNITED STATES PATENTS

| | | | |
|---|---|---|---|
| 943,226 | 12/1909 | Havenstrite | 62—356 |
| 1,087,605 | 2/1914 | Parsons | 62—356 X |
| 1,936,770 | 11/1933 | Pownall | 62—75 |
| 2,506,614 | 5/1950 | Ribeiro | 62—70 |

FOREIGN PATENTS

| | | |
|---|---|---|
| 1,073,813 | 9/1954 | France. |

ROBERT A. O'LEARY, *Primary Examiner.*

W. E. WAYNER, *Assistant Examiner.*

UNITED STATES PATENT OFFICE
CERTIFICATE OF CORRECTION

Patent No. 3,274,794

September 27, 1966

Eugen Wilbushewich

It is hereby certified that error appears in the above numbered patent requiring correction and that the said Letters Patent should read as corrected below.

Column 4, line 62, for "air cooled" read -- air, cooled --.

Signed and sealed this 7th day of January 1969.

(SEAL)
Attest:

Edward M. Fletcher, Jr.
Attesting Officer

EDWARD J. BRENNER
Commissioner of Patents